(12) United States Patent
Johnson et al.

(10) Patent No.: US 7,733,795 B2
(45) Date of Patent: Jun. 8, 2010

(54) VIRTUAL NETWORK TESTING AND DEPLOYMENT USING NETWORK STACK INSTANCES AND CONTAINERS

(75) Inventors: Darrin P. Johnson, Mountain View, CA (US); Erik Nordmark, Mountain View, CA (US); Kais Belgaied, Sunnyvale, CA (US)

(73) Assignee: Oracle America, Inc., Redwood Shores, CA (US)

( * ) Notice: Subject to any disclaimer, the term of this patent is extended or adjusted under 35 U.S.C. 154(b) by 614 days.

(21) Appl. No.: 11/605,114

(22) Filed: Nov. 28, 2006

(65) Prior Publication Data

US 2008/0123536 A1    May 29, 2008

(51) Int. Cl.
*H04J 1/16* (2006.01)
*H04L 12/56* (2006.01)

(52) U.S. Cl. .................. 370/252; 370/241; 370/254; 370/419

(58) Field of Classification Search .............. 370/254, 370/252, 230, 419, 241
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,131,163 A | 10/2000 | Wiegel | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,643,269 B1 * | 11/2003 | Fan et al. | 370/254 |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 7,046,665 B1 | 5/2006 | Walrand et al. | |
| 7,146,431 B2 | 12/2006 | Hipp et al. | |
| 7,177,311 B1 | 2/2007 | Hussain et al. | |
| 7,260,102 B2 | 8/2007 | Mehrvar et al. | |
| 7,313,142 B2 | 12/2007 | Matsuo et al. | |
| 7,478,173 B1 * | 1/2009 | Delco | 709/250 |
| 2002/0052972 A1 | 5/2002 | Yim | |

(Continued)

OTHER PUBLICATIONS

Zec, Marko, "Implementing a Clonable Network Stack in the FreeBSD Kernel", Jun. 2003, Proceedings of the FREENIX Track: 2003 USENIX Annual Technical Conference, 137-150.*

(Continued)

*Primary Examiner*—John Pezzlo
(74) *Attorney, Agent, or Firm*—Osha • Liang LLP

(57) ABSTRACT

A method for testing a network topology. The method includes obtaining the network topology, where the network topology includes a number of nodes connected by at least one link. The method further includes instantiating a number of containers corresponding to the nodes, instantiating a number of virtual network stacks, and instantiating at least one virtual switch corresponding to the at least one link. The containers are subsequently connected to the virtual network stacks using the at least one virtual switch. At least one of the virtual network stacks is then configured to send and receive packets. Finally, the network topology is tested by sending a packet through at least one of the plurality of virtual network stacks and the at least one virtual switch, wherein a result of the testing is used to validate the network topology.

20 Claims, 6 Drawing Sheets

U.S. PATENT DOCUMENTS

| | | | |
|---|---|---|---|
| 2002/0161879 A1* | 10/2002 | Richard | 709/223 |
| 2003/0037154 A1 | 2/2003 | Poggio et al. | |
| 2004/0267866 A1 | 12/2004 | Carollo et al. | |
| 2005/0135243 A1 | 6/2005 | Lee et al. | |
| 2005/0138620 A1 | 6/2005 | Lewites | |
| 2005/0251808 A1* | 11/2005 | Gbadegesin et al. | 719/310 |
| 2006/0041667 A1 | 2/2006 | Ahn et al. | |
| 2006/0070066 A1 | 3/2006 | Grobman | |
| 2006/0174324 A1 | 8/2006 | Zur et al. | |
| 2006/0203848 A1* | 9/2006 | Damphier et al. | 370/469 |
| 2007/0156974 A1* | 7/2007 | Haynes et al. | 711/147 |
| 2008/0028401 A1* | 1/2008 | Geisinger | 718/1 |

OTHER PUBLICATIONS

Tripathi, S.; "Solaris Networking—The Magic Revealed (Part I)"; Sunay Tripathi's Solaris Networking Weblog; Nov. 14, 2005, pp. 1-22 (22 pages).

Tripathi, S.; "CrossBow: Solaris Network Virtualization and Resource Control"; Crossbow Architectual Document, Nov. 21, 2006; 19 pages.

Nordmark, E. et al. ; "IP Instances Interface Document"; PSARC 2006/366, Dec. 28, 2006; 17 pages.

Nordmark, E.; "IP Instances Design Document"; PSARC 2006/366, Dec. 21, 2006; 38 pages.

Tripathi, S.; "CrossBow: Solaris Network Virtualization & Resource Control"; CrossBow Overview Document, Aug. 23, 2006; 12 pges.

Nordmark, E.; "IP Instances—Network Isolation Meets Zones"; presented at the SVOSUG meeting, Oct. 26, 2006; 28 pages.

Tripathi, S.; "CrossBow: Network Virlualization and Resource Control"; presented at the SVOSUG meeting, Aug. 24, 2006; 28 pages.

Tripathi, S., "Crossbow: ReCap"; presented at an internal Sun Labs Open House presentation on Jun. 1, 2006, made public Aug. 2006; 23 pages.

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 Pages).

* cited by examiner

VIRTUAL NETWORK TESTING AND DEPLOYMENT USING NETWORK STACK INSTANCES AND CONTAINERS

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228.

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790.

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. application Ser. No. 11/479,046; "Method and System for Controlling Virtual Machine Bandwidth" with U.S. Pat. No. 7,613,132; "Virtual Switch" with U.S. application Ser. No. 11/480,261; "System and Method for Virtual Network Interface Cards Based on Internet Protocol Addresses" with U.S. application Ser. No. 11/479,997; "Virtual Network Interface Card Loopback Fastpath" with U.S. Pat. No. 7,630,368; "Bridging Network Components" with U.S. Pat. No. 7,634,608; "Reflecting the Bandwidth Assigned to a Virtual Network Interface Card Through Its Link Speed" with U.S. application Ser. No. 11/479,161; "Method and Apparatus for Containing a Denial of Service Attack Using Hardware Resources on a Virtual Network Interface Card" with U.S. application Ser. No. 11/480,100; "Virtual Network Interface Cards with VLAN Functionality" with U.S. application Ser. No. 11/479,998; "Method and Apparatus for Dynamic Assignment of Network Interface Card Resources" with U.S. Pat. No. 7,613,198; "Generalized Serialization Queue Framework for Protocol Processing" with U.S. application Ser. No. 11/479,947; "Serialization Queue Framework for Transmitting Packets" with U.S. application Ser. No. 11/479,143.

The present application contains subject matter that may be related to the subject matter in the following U.S. applications filed on Jul. 20, 2006, and assigned to the assignee of the present application: "Low Impact Network Debugging" with U.S. application Ser. No. 11/489,926; "Reflecting Bandwidth and Priority in Network Attached Storage I/O" with U.S. application Ser. No. 11/489,936; "Priority and Bandwidth Specification at Mount Time of NAS Device Volume" with U.S. application Ser. No. 11/489,934; "Notifying Network Applications of Receive Overflow Conditions" with U.S. application Ser. No. 11/490,821; "Host Operating System Bypass for Packets Destined for a Virtual Machine" with U.S. application Ser. No. 11/489,943; "Multi-Level Packet Classification" with U.S. application Ser. No. 11/490,745; "Method and System for Automatically Reflecting Hardware Resource Allocation Modifications" with U.S. application Ser. No. 11/490,582; "Multiple Virtual Network Stack Instances Using Virtual Network Interface Cards" with U.S. application Ser. No. 11/489,942; "Method and System for Network Configuration for Containers" with U.S. application Ser. No. 11/490,479; "Network Memory Pools for Packet Destinations and Virtual Machines" with U.S. application Ser. No. 11/490,486; "Method and System for Network Configuration for Virtual Machines" with U.S. application Ser. No. 11/489,923; "Multiple Virtual Network Stack Instances" with U.S. application Ser. No. 11/489,929; and "Shared and Separate Network Stack Instances" with U.S. application Ser. No. 11/489,933.

The present application contains subject matter that may be related to the subject matter in the following U.S. application filed on Nov. 28, 2006, and assigned to the assignee of the present application: "Method and System for Creating A Demilitarized Zone using Network Stack Instances" with U.S. Pat. No. 7,633,864.

BACKGROUND

Network traffic is transmitted over a network, such as the Internet, from a sending computer system, via a first network interface card (NIC), to a receiving computer system via a second NIC. The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically transmitted through one or more connections. The connections may occur on a physical level. For example, the packets may be transmitted as signals (e.g., electrical, optical, etc) between the two systems through a variety of cables, routers, transmitters, receivers, and/or other interconnected hardware. In addition, the connections may occur on a logical level. For example, in order for the sending system and receiving system to communicate with one another, packets must properly reach the receiving system from the sending system. The receiving device must also recognize that the packets received are indeed meant for the receiving device and separate the packets from other incoming signals. Networking protocols dictate the rules for data representation, signaling, transfer, authentication, and error detection required to transmit information between the sending system and receiving system.

The Open Systems Interconnection Reference Model (OSI model) describes seven different layers that define requirements for communications between two computer systems. The OSI model was developed to enable interoperability between platforms offered by various vendors. Each layer of the OSI model performs services for the layer above and requests services from the layer below. In order from lowest to highest, the layers of the OSI model are: (i) the physical layer, which defines the electrical and physical specifications for devices, (ii) the data link layer, which specifies the transfer of data between network entities, (iii) the network layer, which describes the transmission of variable length data sequences from a source to a destination via one or more networks, (iv) the transport layer, which transfers data between end users, (v) the session layer, which opens, maintains, and closes connections between network devices, (vi) the presentation layer, which transforms data into a form usable by an application, and finally, (vii) the application layer, which allows a user to access the information transmitted over the network.

SUMMARY

In general, in one aspect, the invention relates to a method for testing a network topology. The method includes obtaining the network topology, wherein the network topology comprises a plurality of nodes connected by at least one link, instantiating a plurality of containers, wherein each of the plurality of containers corresponds to one of the plurality of nodes, instantiating a plurality of virtual network stacks, wherein each of the plurality of virtual network stacks is associated with one of the plurality of containers, and wherein each of the plurality of virtual network stacks is associated with a virtual network interface card (NIC), instantiating at least one virtual switch corresponding to the at least one link, connecting at least one of the plurality of virtual NICs associated with at least one of the plurality of virtual network stacks using the at least one virtual switch, configuring at least one of the plurality of virtual network stacks to send and receive packets, and testing the network topology by sending a packet through at least one of the plurality of virtual network stacks and the at least one virtual switch, wherein a result of the testing is used to validate the network topology.

In general, in one aspect, the invention relates to a system. The system includes a host, that includes a plurality of containers, a plurality of virtual network stacks, wherein each of the plurality of virtual network stacks corresponds to one of the plurality of containers, a plurality of virtual network interface cards (NICs), wherein each of the plurality of network interface cards corresponds to one of the plurality of virtual network stacks, and at least one virtual switch connecting at least one of the plurality of virtual NICs. Further, each of the plurality of containers corresponds to one of a plurality of nodes in the virtual network, and wherein the at least one virtual switch corresponds to at least one link in the virtual network.

In general, in one aspect, the invention relates to a computer usable medium having computer readable program code embodied therein for causing a computer system to execute a method for testing a network topology. The method includes obtaining the network topology, wherein the network topology comprises a plurality of nodes connected by at least one link, instantiating a plurality of containers, wherein each of the plurality of containers corresponds to one of the plurality of nodes, instantiating a plurality of virtual network stacks, wherein each of the plurality of virtual network stacks is associated with one of the plurality of containers, wherein each of the plurality of virtual network stacks is associated with a virtual network interface card (NIC), instantiating at least one virtual switch corresponding to the at least one link, connecting at least one of the plurality of virtual NICs associated with at least one of the plurality of virtual network stacks using the at least one virtual switch, configuring at least one of the plurality of virtual network stacks to send and receive packets, and testing the network topology by sending a packet through at least one of the plurality of virtual network stacks and the at least one virtual switch, wherein a result of the testing is used to validate the network topology.

Other aspects of the invention will be apparent from the following description and the appended claims.

DETAILED DESCRIPTION

Figure 1:
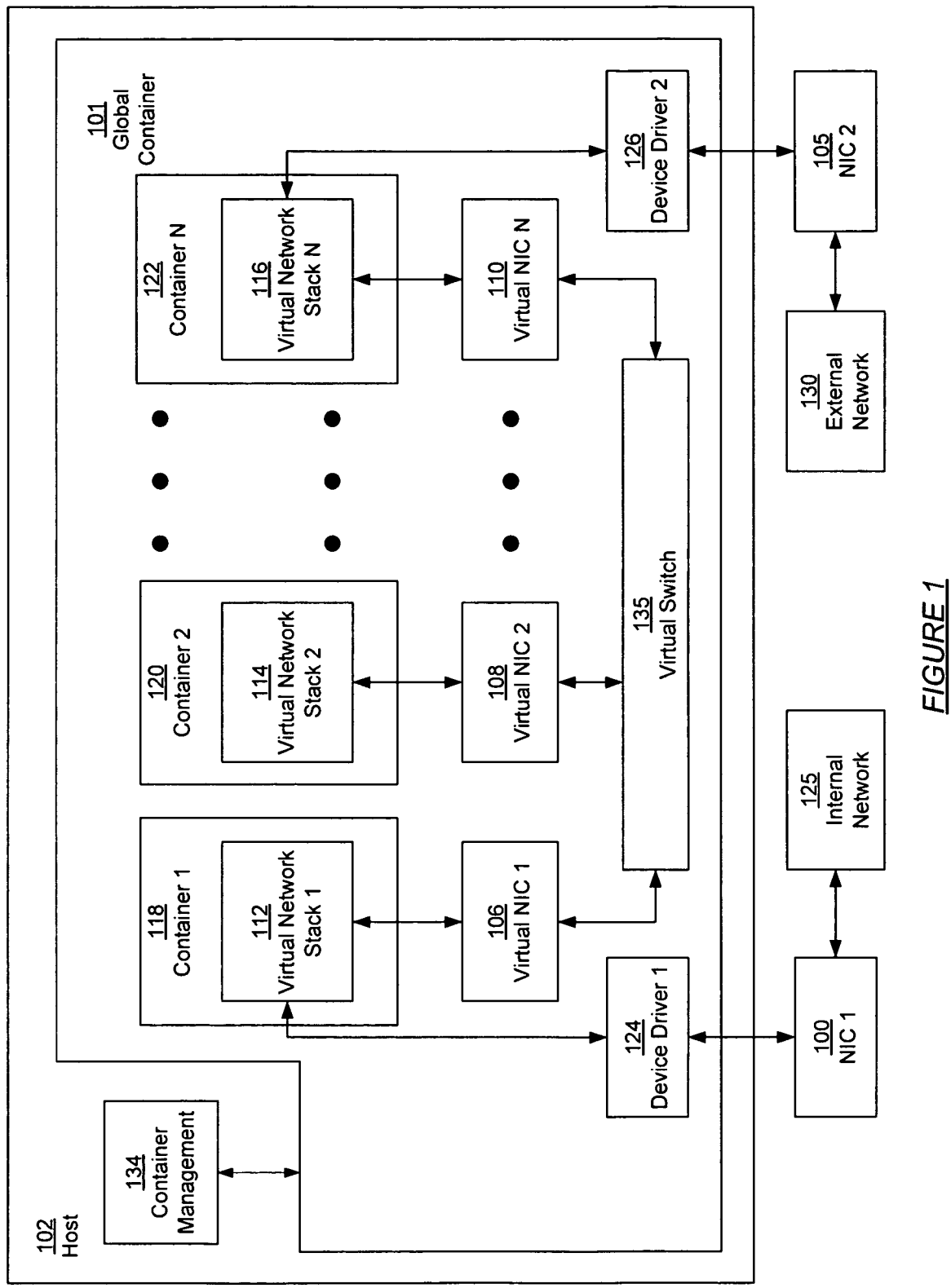
FIGS. 1-2 show schematic diagrams in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus for building a virtual network in a host. In one embodiment of the invention, the virtual network implements an arbitrary network topology composed of nodes and links. In one embodiment of the invention, nodes in the network topology are implemented as containers, which correspond to isolated execution environments, and links in the network topology are represented by one or more virtual switches, which are software equivalents of network switches. Further, embodiments of the invention enable any network topology to be tested within a single host. In addition, embodiments of the invention also allow the creation of a network production solution within a single host. Moreover, embodiments of the invention enable testing of arbitrary network topologies on a single host with reduced complexity and cost, greater efficiency and safety, and higher rates of utilization.

FIG. 1 shows a schematic diagram of a system in accordance with one or more embodiments of the invention. As shown in FIG. 1, the system includes a host (102) and multiple physical NICs (e.g., NIC 1 (100), NIC 2 (105)) connected to different networks (e.g., internal network (125), external network (130)). The system also includes device drivers for each NIC (e.g., device driver 1 (124), device driver 2 (126)) and multiple containers (e.g., global container (101), container 1 (118), container 2 (120), container N (122)), each of which includes a virtual network stack (e.g., virtual network stack 1 (112), virtual network stack 2 (114), virtual network stack N (116)). Each container (e.g., global container (101), container 1 (118), container 2 (120), container N (122)) is further connected to a virtual NIC (e.g., virtual NIC 1 (106), virtual NIC 2 (108), virtual NIC N (110)). The host (102) also includes a container management module (134) that provides functionality to configure the aforementioned container and a virtual switch (135) configured to connect the aforementioned virtual NICs. Each of these components is described below.

In one embodiment of the invention, the NICs (e.g., NIC 1 (100), NIC 2 (105)) provide an interface between the host (102) and a network (e.g., internal network (125), external network (130)) (e.g., a local area network, a wide area network, a wireless network, etc.). More specifically, each of the NICs (e.g., NIC 1 (100), NIC 2 (105)) includes a network interface (NI) (i.e., the hardware on the NIC used to interface with the network). For example, the NI may correspond to an RJ-45 connector, a wireless antenna, etc. The packets received by the NI are then sent to other components on the NIC (e.g., NIC 1 (100), NIC 2 (105)) for processing.

In one or more embodiments of the invention, the host (102) may include a device driver(s) (e.g., device driver 1 (124), device driver 2 (126)) and one or more virtual NICs (e.g., virtual NIC 1 (106), virtual NIC 2 (108), virtual NIC N (110)). In one embodiment of the invention, each device driver provides an interface between a NIC (e.g., NIC 1 (100), NIC 2 (105)) and the host (102). More specifically, the device drivers (e.g., device driver 1 (124), device driver 2 (126)) expose the NICs (e.g., NIC 1 (100), NIC 2 (105)) to the host (102).

In one or more embodiments of the invention, each virtual NIC (e.g., virtual NIC 1 (106), virtual NIC 2 (108), virtual NIC N (110)) is operatively connected to containers (e.g., container 1 (118), container 2 (120), container N (122)) via a virtual network stack (e.g., virtual network stack 1 (112), virtual network stack 2 (114), virtual network stack N (116)). Each virtual NIC (e.g., virtual NIC 1 (106), virtual NIC 2 (108), virtual NIC N (110)) provides an abstraction layer between the NICs (e.g., NIC 1 (100), NIC 2 (105)) and the containers (e.g., container 1 (118), container 2 (120), container N (122)) on the host (102). More specifically, each virtual NIC (e.g., virtual NIC 1 (106), virtual NIC 2 (108), virtual NIC N (110)) operates like a NIC (e.g., NIC 1 (100), NIC 2 (105)). For example, in one or more embodiments of the invention, each virtual NIC (e.g., virtual NIC 1 (106), virtual NIC 2 (108), virtual NIC N (110)) is associated with one or more Internet Protocol (IP) addresses and associated with one or more Media Access Control (MAC) addresses. Each virtual NIC (e.g., virtual NIC 1 (106), virtual NIC 2 (108), virtual NIC N (110)) may also be associated with one or more ports and configured to handle one or more protocol types. As a result, containers (e.g., container 1 (118), container 2 (120), container N (122)) on the host (102) are unable to distinguish a virtual NIC (e.g., virtual NIC 1 (106), virtual NIC 2 (108), virtual NIC N (110)) from a physical NIC (e.g., NIC 1 (100), NIC 2 (105)).

In one or more embodiments of the invention, each virtual network stack (e.g., virtual network stack 1 (112), virtual network stack 2 (114), virtual network stack N (116)) includes functionality to process packets in accordance with various protocols used to send and receive packets (e.g., Transmission Communication Protocol (TCP), Internet Protocol (IP), User Datagram Protocol (UDP), etc.). Further, each virtual network stack may also include functionality, as needed, to perform additional processing on the incoming and outgoing packets. This additional processing may include, but is not limited to, cryptographic processing, firewall routing, etc.

In one or more embodiments of the invention, the virtual network stacks (e.g., virtual network stack 1 (112), virtual network stack 2 (114), virtual network stack N (116)) correspond to network stacks with network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.). In one or more embodiments of the invention, the virtual network stacks (e.g., virtual network stack 1 (112), virtual network stack 2 (114), virtual network stack N (116)) implement an IP layer (not shown) and a TCP layer (not shown). The virtual network stack (e.g., virtual network stack 1 (112), virtual network stack 2 (114), virtual network stack N (116)) is described in further detail in FIG. 2.

In one or more embodiments of the invention, the virtual network stacks (e.g., virtual network stack 1 (112), virtual network stack 2 (114), virtual network stack N (116)) are connected to one another via corresponding virtual NICs (e.g., virtual NIC 1 (106), virtual NIC 2 (108), virtual NIC N (110)) and a virtual switch (135). In one or more embodiments of the invention, the virtual switch (135) functions as a software equivalent of a network switch. In other words, the virtual switch (135) performs transparent bridging of network segments (i.e., virtual NICs) within the host (102). For example, virtual network stack 1 (112) can transmit and receive packets to virtual network stack 2 (114) by using virtual NIC 1 (106), the virtual switch (135), and virtual NIC 2 (108).

In one or more embodiments of the invention, all virtual NICs (e.g., virtual NIC 1 (106), virtual NIC 2 (108), virtual NIC N (110)) connected to the virtual switch (135) are registered in the virtual switch's address table (not shown). In one or more embodiments of the invention, each virtual NIC (e.g., virtual NIC 1 (106), virtual NIC 2 (108), virtual NIC N (110)) corresponds to an entry in the address table. Each entry in the address table includes a MAC address of the virtual NIC (e.g., virtual NIC 1 (106), virtual NIC 2 (108), virtual NIC N (110)) corresponding to the entry, as well as a pointer to the virtual NIC. The virtual switch (135) routes packets to their destinations using the address table. When a packet is received by the virtual switch (135), the destination address is checked against the entries in the address table. If a match is found, the packet is sent directly to the virtual NIC (e.g., virtual NIC 1 (106), virtual NIC 2 (108), virtual NIC N (110)) associated with the match, which then sends the packet to the corresponding virtual network stack (e.g., virtual network stack 1 (112), virtual network stack 2 (114), virtual network stack N (116)). If a match is not found, the packet is dropped. In one embodiment of the invention, the virtual switch corresponds to the virtual switch disclosed in the co-pending patent application entitled "Virtual Switch" (application Ser.

No. 11/480,261) and assigned to assignee of the present application. The aforementioned patent application is hereby incorporated by reference.

As shown in FIG. 1, the host (102) includes a global container (101) and a number of non-global containers (e.g., container 1 (118), container 2 (120), container N (122)). The global container (101) corresponds to an isolated execution environment within the host (102). Further, each non-global container (e.g., container 1 (118), container 2 (120), container N (122)) corresponds to an isolated execution environment within the global container (101). All of the containers (global and non-global) share a common kernel, and as a result, execute the same operating system. While all of the containers share a common kernel, the non-global containers (e.g., container 1 (118), container 2 (120), container N (122)) are configured such that processes executing in a given non-global container are restricted to execute in the non-global container and have no access to resources not assigned to the non-global container. The isolated execution environments of each non-global container (e.g., container 1 (118), container 2 (120), container N (122)) as well as the global container (101) are managed by a container management component (134) executing on the host (102). The container management component (134) typically executes outside of the global container (101). An example of a container is a Solaris™ Container. (Solaris is a trademark of Sun Microsystems, Inc. of California, USA)

Each of the non-global containers (e.g., container 1 (118), container 2 (120), container N (122)) is configured to send and receive packets to and from the NICs (e.g., NIC 1 (100), NIC 2 (105)), as well as between one another through the virtual switch (135). The virtual network stacks (e.g., virtual network stack 1 (112), virtual network stack 2 (114), virtual network stack N (116)) within the non-global containers (e.g., container 1 (118), container 2 (120), container N (122)) process outgoing packets before transmitting the packets to other containers or hosts; the virtual network stacks also process incoming packets from other sources before sending the packets to the containers. In one or more embodiments of the invention, each non-global container (e.g., container 1 (118), container 2 (120), container N (122)) and the global container (101) are identified by a container ID, which uniquely identifies the container in the host (102).

In one or more embodiments of the invention, a virtual network is implemented using the containers (e.g., container 1 (118), container 2 (120), container N (122)), virtual network stacks (e.g., virtual network stack 1 (112), virtual network stack 2 (114), virtual network stack N (116)), virtual NICs (e.g., virtual NIC 1 (106), virtual NIC 2 (108), virtual NIC N (110)), and the virtual switch (135). The virtual network may be used to test a network topology, or may be used as a production solution. In other words, the system of FIG. 1 may be used to examine if a planned network behaves as expected, or the system may implement the planned network in a real-world environment.

In one or more embodiments of the invention, each of the containers (e.g., container 1 (118), container 2 (120), container N (122)) represent a node in the network topology. The containers (e.g., container 1 (118), container 2 (120), container N (122)) are connected by a virtual switch (135), which provides the links in the network topology. If a more complex network topology is desired, multiple virtual switches (135) may be used to connect the containers (e.g., container 1 (118), container 2 (120), container N (122)) in various ways. For example, a fully connected network topology may be implemented by connecting all containers with one switch, or a ring topology may be constructed by connecting every set of consecutive containers using a separate virtual switch, then linking the first and last containers using another virtual switch.

In one or more embodiments of the invention, the virtual switches (135) are configured to send packets to the next hop in the path to the packet's destination. For example, a virtual switch (135) may be configured to automatically send packets from one virtual network stack (e.g., virtual network stack 1 (112), virtual network stack 2 (114), virtual network stack N (116)) to another if an explicit match is not found; a ring topology or linear topology network may also be implemented using the above method. Alternatively, a single virtual NIC (e.g., virtual NIC 1 (106), virtual NIC 2 (108), virtual NIC N (110)) may match multiple addresses in the virtual switch's (135) address table. That virtual NIC (e.g., virtual NIC 1 (106), virtual NIC 2 (108), virtual NIC N (110)) may function as a next hop to a packet's destination. Packets sent to that virtual NIC (e.g., virtual NIC 1 (106), virtual NIC 2 (108), virtual NIC N (110)) by a virtual switch (135) are then processed by the virtual network stack (e.g., virtual network stack 1 (112), virtual network stack 2 (114), virtual network stack N (116)) connected to the virtual NIC and sent to another virtual switch (135) based on the packet's destination. In one or more embodiments of the invention, the virtual network stack (e.g., virtual network stack 1 (112), virtual network stack 2 (114), virtual network stack N (116)) uses a routing table to determine to which virtual switch to send the packets.

In one or more embodiments of the invention, one or more containers (e.g., container 1 (118), container 2 (120), container 3 (122)) within the virtual network may, optionally, provide services to the internal network (125) and/or the external network (130). These services may include email, web server functionality, database, and DNS lookup utilities. In addition, the containers (e.g., container 1 (118), container 2 (120), container N (122)) may implement application-layer firewalls, such as Extensible Markup Language (XML) firewalls. Packets received from one network (e.g., internal network (125), external network (130)) may be bound for the other network, or for a container (e.g., container 1 (118), container 2 (120), container N (122)) in the host (102). For example, packets from the external network (130) may request a web page from a container (e.g., container 1 (118), container 2 (120), container N (122)) that acts as a web server. On the other hand, packets from the internal network (125) may request a web page from the external network (130), which may be connected to the Internet.

In one or more embodiments of the invention, each virtual network stack (e.g., virtual network stack 1 (112), virtual network stack 2 (116)) may be customized to reflect the functionality and/or requirements of the corresponding container (e.g., container 1 (118), container 2 (120), container N (122)). For example, each virtual network stack (e.g., virtual network stack 1 (112), virtual network stack 2 (116)) may have a different routing table, routing algorithm, transport protocol, security policy, network firewall, etc. based on the needs of the corresponding container (e.g., container 1 (118), container 2 (120), container N (122)). As a result, the arbitrary numbers of containers (e.g., container 1 (118), container 2 (120), container N (122)) and virtual switches (135), as well as the customizability of the virtual network stacks (e.g., virtual network stack 1 (112), virtual network stack 2 (116)), allow for any computer network to be built within a single host (102), subject to resource constraints.

Those skilled in the art will appreciate that the virtual network of FIG. 1 may be created, modified, or destroyed dynamically without affecting the uptime of the host (102). For example, any number of containers (e.g., container 1

(118), container 2 (120), container N (122)) and virtual network stacks (e.g., virtual network stack 1 (112), virtual network stack 2 (114), virtual network stack 3 (116)) connected by any number of virtual switches (110) in a variety of fashions may be added and configured or removed while the virtual network is running. In addition, the host may be connected to other NICs (e.g., NIC 1 (100), NIC 2 (105)), which may be connected to other networks (e.g., internal network (125), external network (130)) and associated with one or more virtual network stacks (e.g., virtual network stack 1 (112), virtual network stack 2 (114), virtual network stack N (116)). For example, a new node on the network may be created using a container (e.g., container 1 (118), container 2 (120), container N (122)). The container (e.g., container 1 (118), container 2 (120), container N (122)) may then be connected to the other nodes by adding a virtual network stack (e.g., virtual network stack 1 (112), virtual network stack 2 (114), virtual network stack N (116)) and virtual NIC (e.g., virtual NIC 1 (106), virtual NIC 2 (108), virtual NIC N (110)) and connecting the virtual NIC to a virtual switch (135). Other containers (e.g., container 1 (118), container 2 (120), container N (122)) or hosts on the networks (e.g., internal network (125), external network (130)) may then use the new node by sending and receiving packets to and from the new container via the virtual switch (135). Though not shown in FIG. 1, a single host may also include multiple distinct virtual networks.

In one or more embodiments of the invention, an internal network (125) corresponds to a network that is privately administered and set up. For example, an internal network (125) may correspond to an organization's Local Area Network (LAN). In one embodiment of the invention, the external network (130) refers to a network that is not privately administered and controlled. For example, the external network (130) may correspond to the Internet.

Figure 2:
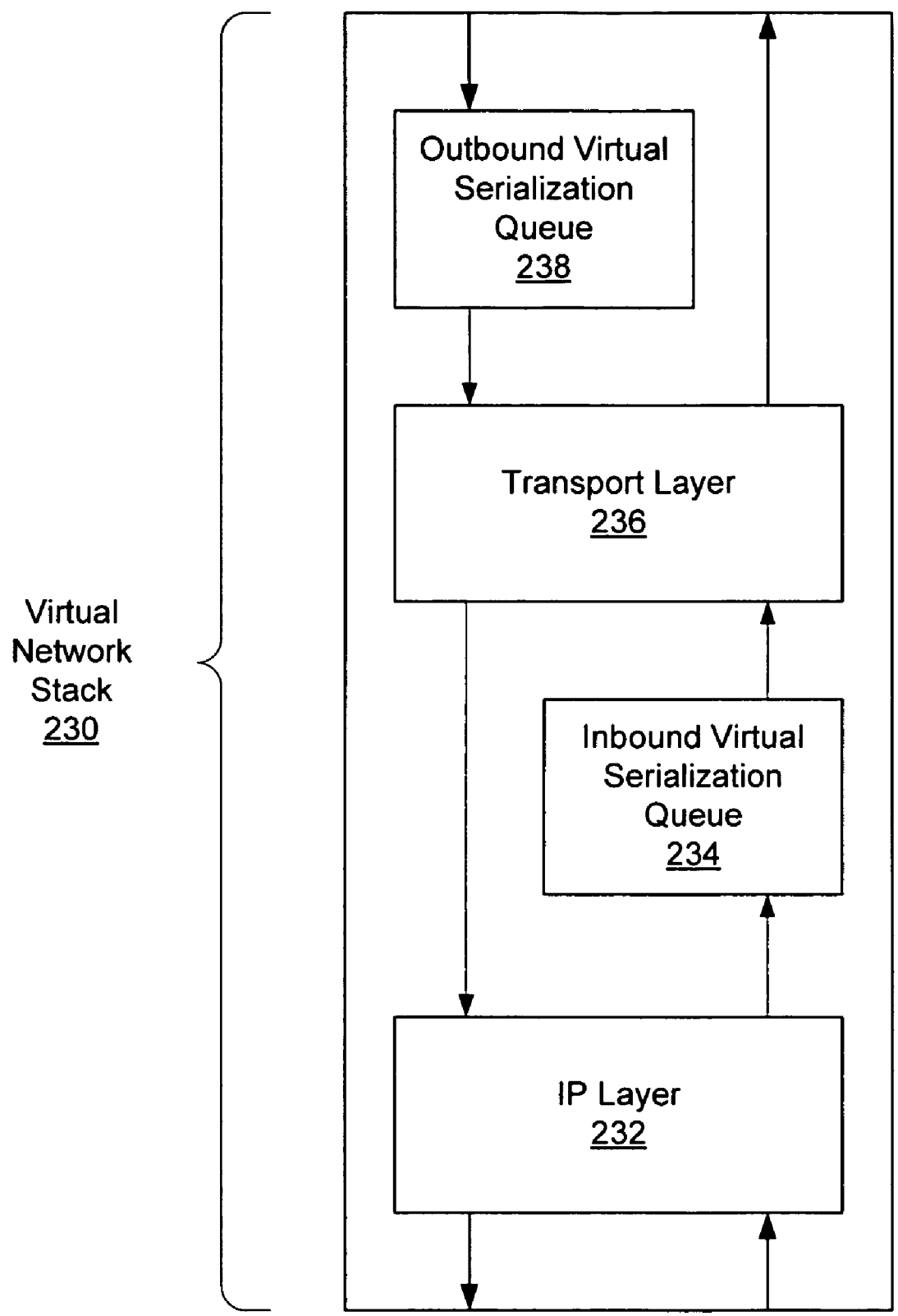

FIG. 2 shows a virtual network stack in accordance with one embodiment of the invention. In one embodiment of the invention, the virtual network stack (230) includes an Internet Protocol (IP) layer (232), an inbound virtual serialization queue (234), a transport layer (236), and an outbound virtual serialization queue (238). Each of the components is discussed below.

In one embodiment, the IP layer (232) is configured to receive packets from the virtual NIC associated with the virtual network stack (234). Further, the IP layer (232) is setup to receive packets from the transport layer (206). In one embodiment of the invention, the IP layer (232) is configured to perform IP level processing for both inbound and outbound packets. In one embodiment of the invention, the IP layer (232) is associated with a hardware (e.g., MAC) address to IP address mapping.

Continuing with the discussion of FIG. 2, the inbound virtual serialization queue (234) is configured to receive packets from the IP layer (232). The inbound virtual serialization queue (234) corresponds to a queue data structure which queues packets received from the IP layer (232) prior to the packets being processed by the transport layer (236). In one embodiment of the invention, the inbound virtual serialization queue (234) may be used to control the number of packets being received by the container associated with the virtual network stack (234). The inbound virtual serialization queue (234) may control the bandwidth by limiting the number of packets in the virtual serialization queue (234) and preventing additional packets from entering the virtual network stack (230) until the inbound virtual serialization queue (234) has less than a threshold number of packets.

In one embodiment of the invention, the transport layer (236) is configured to process inbound and outbound packets in accordance with the Transmission Control Protocol (TCP) and/or User Datagram Protocol (UDP).

In one or more embodiments of the invention, the outbound virtual serialization queue (238) is a queue data structure for receiving packets from the container with which the virtual network stack (234) is associated. Further, the outbound virtual serialization queue (238) stores the packets prior to sending the received packets to the transport layer (236). In one embodiment of the invention, the outbound virtual serialization queue (238) is also able to control the flow of packets from the container associated with the virtual network stack (234) to the virtual network stack (234). In one embodiment of the invention, the outbound virtual serialization queue (238) (or a related process) may block the container from sending packets to the outbound virtual serialization queue (238) if the container attempts to issue packets at a higher rate than the outbound bandwidth allocated to the container. Further, the outbound virtual serialization queue (238) (or a related process) is configured to notify the container when the queue is no longer blocked from issuing packets to the virtual network stack (234).

In one or more embodiments of the invention, the inbound virtual serialization queue (234) and outbound virtual serialization queue (238) enforce the manner in which packets are processed. Specifically, the inbound virtual serialization queue (234) and outbound virtual serialization queue (238) may be configured to enforce the packet processing requirements imposed by the transport layer (236). For example, TCP requires serial processing of packets. Thus, the inbound virtual serialization queue (234) and outbound virtual serialization queue (238) may require all threads accessing the inbound virtual serialization queue (234) and outbound virtual serialization queue (238) to conform to a mutual exclusion policy. In one embodiment of the invention, the mutual exclusion policy may restrict access to the virtual serialization queue to one thread at a time. Thus, if two threads are attempting to access a given virtual serialization queue, one thread must wait until the other thread has finished accessing the virtual serialization queue.

Alternatively, if the transport layer (236) only supports UDP, then the inbound virtual serialization queue (234) and outbound virtual serialization queue (238) may allow concurrent access by multiple threads. In one embodiment of the invention, if the transport layer (236) is configured to process both TCP and UDP packets, then the inbound virtual serialization queue (234) and outbound virtual serialization queue (238) are set to conform to the more stringent standard (e.g., TCP if the transport layer supports both TCP and UDP).

Figure 3:
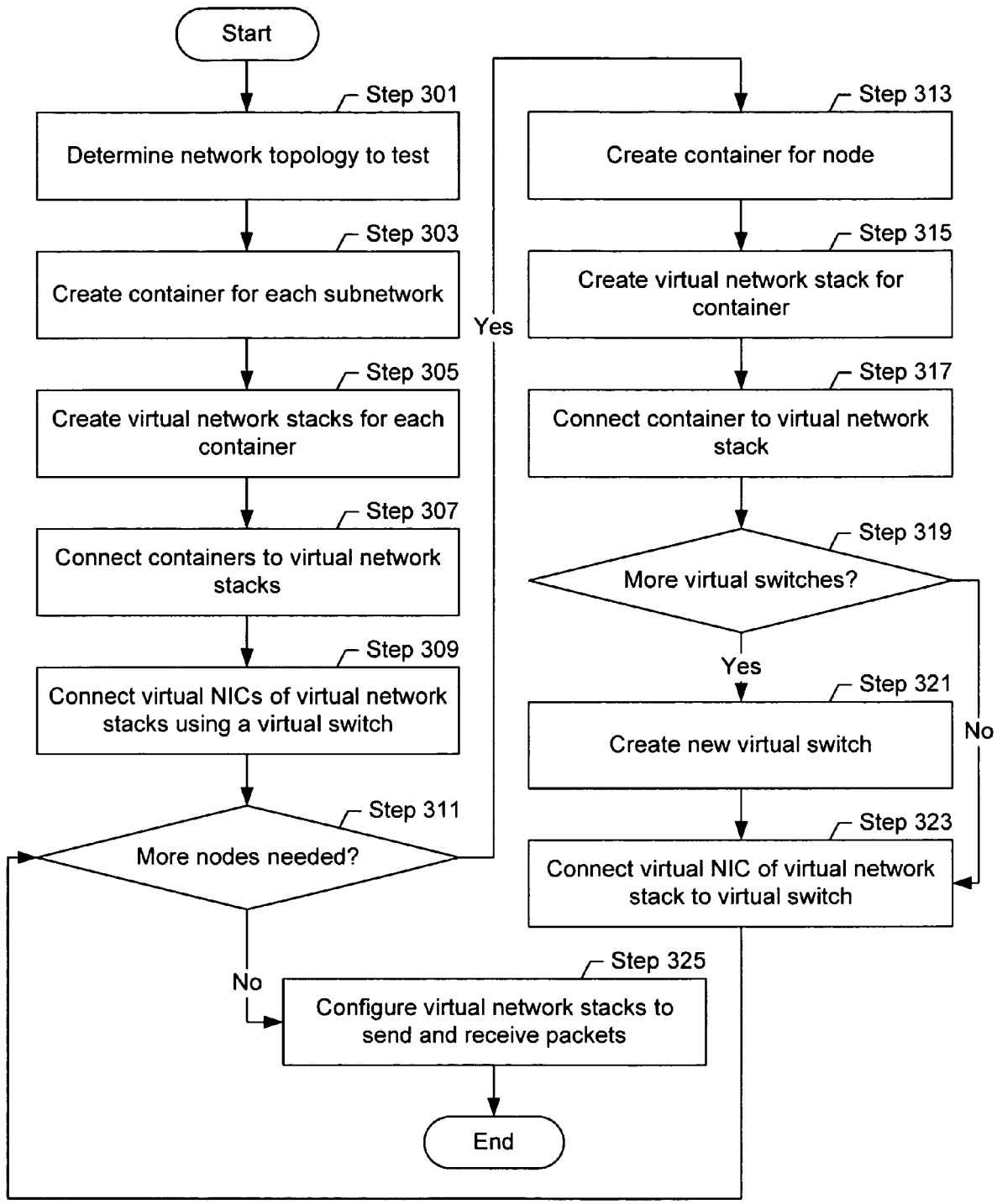
FIGS. 3-4 show flow diagrams in accordance with one or more embodiments of the invention.

FIG. 3 shows a flow diagram of a virtual network setup in accordance with one or more embodiments of the invention. In one embodiment of the invention, one or more of the steps described below may be omitted, repeated, and/or performed in a different order. Accordingly, the specific arrangement of steps shown in FIG. 3 should not be construed as limiting the scope of the invention.

As stated above, an arbitrary network topology and configuration may be tested by creating and connecting virtual network components within a single host. First, the network topology to test is determined (Step 301). For example, an administrator may want to deploy a computer cluster. However, the administrator may also want to test the network topology of the computer cluster to ensure that all components are working properly and as expected, or the administrator may decide to test various network configurations for optimal speed or reliability before implementing the cluster using multiple machines and network connections between the machines.

Once a given network topology to test is determined, a container is created for each subnetwork connected to the virtual network (Step 303). In one or more embodiments of the invention, the container governs network traffic to and from the associated subnetwork. To do so, a virtual network stack is created for each container (Step 305) associated with a subnetwork. The containers are first connected to their virtual network stacks (Step 307), and the virtual network stacks are subsequently connected to one another by linking their virtual NICs with a virtual switch (Step 309). If a particular container is standalone, that container is not connected to the virtual switch. In one embodiment of the invention, the virtual network stacks are able to allow, deny, and modify network traffic by monitoring all incoming and outgoing packets to their respective subnetworks.

Next, a determination is made about whether to add additional containers to the virtual network (Step 311). If the existing components satisfy the needs of the virtual network, the virtual network stacks are configured to send and receive packets (Step 325) as dictated by the network configuration. Configuring the virtual network stacks includes setting a routing algorithm, transport protocol, routing table, security policy, etc. for each virtual networks tack. Alternatively, if additional nodes are to be added to the virtual network, then a container is created for each additional the node (Step 313). A virtual network stack is created for the container (Step 315) and then connected to the container (Step 317). A determination is then made about whether to add additional virtual switches to the virtual network (Step 319). For example, a linear topology requires a new virtual switch for each node that is added to the network. If so, a new virtual switch is created (Step 321) and the virtual NIC corresponding to the virtual network stack is connected to the new virtual switch (Step 323). Otherwise, the virtual NIC is connected to an existing virtual switch (Step 323).

Step 311-323 are repeated until the desired virtual network is formed. Finally, the virtual network stacks are configured to send and receive packets as specified by the virtual network configuration (Step 325).

Figure 4:
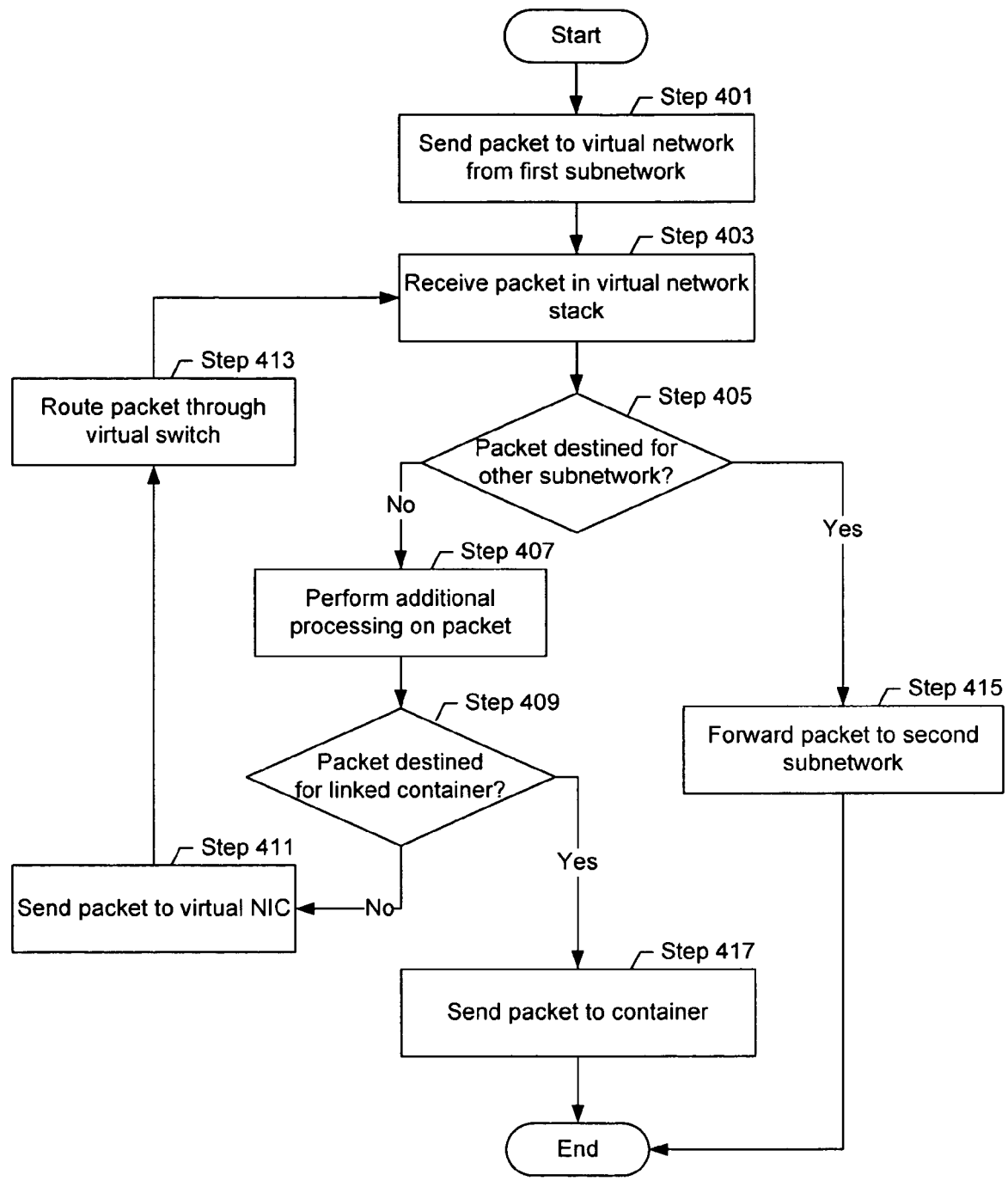

FIG. 4 shows a flow diagram of processing a packet by the virtual network in accordance with one or more embodiments of the invention. In one embodiment of the invention, one or more of the steps described below may be omitted, repeated, and/or performed in a different order. Accordingly, the specific arrangement of steps shown in FIG. 4 should not be construed as limiting the scope of the invention.

Initially, a packet is sent from a first subnetwork to the virtual network (Step 401). The first subnetwork may be the internal network or the external network. In addition, the packet may be processed differently depending on the packet source, packet destination, transport protocol, domain name, etc. Once the packet is sent to the virtual network, the packet is received in a virtual network stack (Step 403) associated with the first subnetwork.

Next, a determination is made as to whether the packet is destined for another subnetwork connected to the virtual network (Step 405). If so, the packet is sent through the virtual switch to the virtual network stack associated with the second subnetwork, where it is subsequently sent to the NIC and transmitted to the second subnetwork (Step 415). If not, the packet is processed at the receiving virtual network stack (Step 407). Processing of the packet may include encryption, authentication, network address translation (NAT), etc.

Once the packet is processed, a determination is made about whether the packet's destination is a container directly connected to the receiving virtual network stack in the virtual network (Step 409). In other words, a determination is made about whether the packet's current virtual network stack is directly connected via a virtual switch to the packet's destination (i.e., if the current node is linked to the destination node). If so, the packet is sent through the virtual switch to the destination container (Step 417). Otherwise, the packet is sent to the virtual NIC of the current virtual network stack (Step 411) and on to a virtual switch (Step 413) connected to the current virtual stack, where the packet is sent to another virtual network stack on the path to the packet's destination (Step 403). In one or more embodiments of the invention, the virtual network stacks and/or virtual switches in the virtual network are programmed to send packets to the next hop in the packet's destination. This process is repeated until the packet arrives at its destination.

For example, if the virtual network implements a linear topology with 10 nodes and the packet's destination is the last node in the chain, the packet will be passed from virtual network stack to virtual switch nine times before arriving at its destination. Those skilled in the art will appreciate that the packet may never arrive at its destination if the network topology and/or configuration are faulty. As a result, an administrator may determine if a network topology and/or configuration is behaving as expected by sending packets through the virtual network and recording the paths and connection states associated with the packets. Once a network topology or configuration is deemed correct or optimal, the topology or configuration may be implemented using multiple machines, such as in a data center, server farm, or computer cluster, or the topology or configuration may be released using the virtual network on a single host if all network needs can be met by that host.

While FIGS. 3 and 4 have described the creation and use of a system connected to one or more subnetworks, embodiments of the invention enable the creation of a system where a network is fully implemented inside a single host. In other words, every node on the network resides within a single system. The system may have a connection to the Internet through one or more physical NICs, or the system may not be connected to an external network at all and just pass packets back and forth between virtualized nodes within the host. Further, in one embodiment of the invention, a virtual network may be implemented in a single host and connected to a single subnetwork.

For example, a packet may be received by a host containing an entire virtual network through one or more physical NICs connected to an external network, such as the Internet. The packet is then sent through one or more virtual NICs, virtual network stacks, and possibly through one or more virtual switches before arriving at its destination container. The packet's destination container may then process the packet and send a reply back to the external network, or forward the packet and/or additional data to other containers on the host. Those skilled in the art will appreciate that each container in the host may operate as a client or as a server. For example, a container may include one or more web browsers or web crawlers for accessing information stored on the Internet. Alternatively, the container may itself be a web server, email server, database, etc. that provides information to other containers in the host and other locations on the Internet. The container may even operate both as a server and as a client. For example, the container may include an archive of data accessible by authenticated users on the Internet. At the same time, the archive is automatically updated against archives on other servers on the Internet. The archive would then function as a server when responding to requests for data by users, and as a client when requesting data from other archives.

Figure 5:
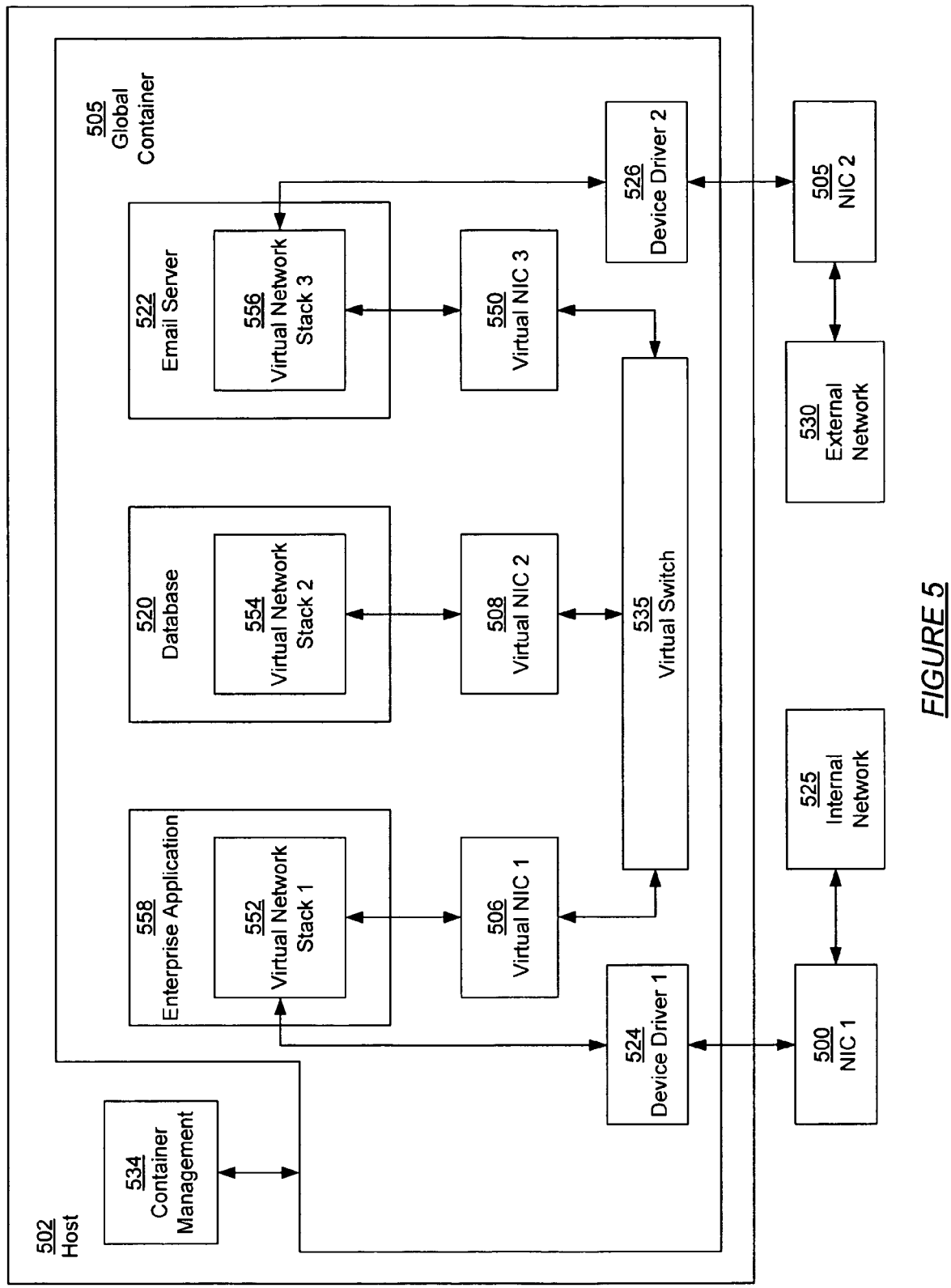
FIG. 5 shows a virtual network topology in accordance with one or more embodiments of the invention.

FIG. 5 shows an example virtual network topology in accordance with one or more embodiments of the invention. As shown in FIG. 5, the virtual network resides in a single host (502) and includes a global container (505), a container management module (534), an enterprise application (558), a database (520), an email server (522), three virtual network stacks (e.g., virtual network stack 1 (552), virtual network stack 2 (554), virtual network stack 3 (556)), three virtual NICs (e.g., virtual NIC 1 (506), virtual NIC 2 (508), virtual NIC 3 (550)), a virtual switch (535), two device drivers (e.g., device driver 1 (524), device driver 2 (526)), and two physical NICs (e.g., NIC 1 (500), NIC 2 (505)). In one or more embodiments of the invention, the virtual network of FIG. 5 is used to implement all levels (e.g., user interface, business logic, persistence layer, etc.) of an enterprise application for a large number of users, both internal and external.

As shown in FIG. 5, the enterprise application (558), database (520), and email server (522) are containers within the global container (505) in the host (502). In addition, each non-global container (e.g., enterprise application (558), database (520), email server (522)) includes a virtual network stack (e.g., virtual network stack 1 (552), virtual network stack 2 (554), virtual network stack 3 (556)). Each virtual network stack (e.g., virtual network stack 1 (552), virtual network stack 2 (554), virtual network stack 3 (556)) is operatively connected to a virtual NIC (e.g., virtual NIC 1 (506), virtual NIC 2 (508), virtual NIC 3 (550)) for sending, receiving, and processing packets to and from each other, as well as the internal network (525) and external network (530) through the physical NICs (e.g., NIC 1 (500), NIC 2 (505)). In addition, the non-global containers (e.g., enterprise application (558), database (520), email server (522)) are connected using a virtual switch (535), which, as mentioned previously, is a software equivalent of a network switch and routes packets between virtual NICs (e.g., virtual NIC 1 (506), virtual NIC 2 (508), virtual NIC 3 (550)) on the host (502) using an address table.

The system of FIG. 5 may be used, for example, to provide web-based business functions for investing, accounting, production scheduling, banking, insurance, etc. The application (e.g., a Java 2 Enterprise Edition™ (Java 2 Enterprise Edition™ is a registered trademark of Sun Microsystems, Inc.)) may include multiple user accounts with multiple levels of access to the application. For example, a user with a bank account on the application may only be allowed to view his/her account balances, as well as perform basic functions pertaining to his/her accounts, whereas a manager on the application may be allowed to view and change multiple user accounts, as well as functionalities hidden from normal users, such as the ability to control interest rates, fees, member benefits, etc. In addition, each user account, as well as any associated data, preferences, access levels, etc. is stored in the database (e.g., a Structured Query Language (SQL) database) (520) and accessed through the enterprise application (558). Each user account is also associated with a login and password stored in the database, which a user must provide to the enterprise application (558) in order to access other functionalities of the enterprise application (558). Further, one or more user accounts may be associated with one or more email addresses, which are provided by the email server (522).

A packet from the internal network (525) or external network (530) is sent to a physical NIC (e.g., NIC 1 (500), NIC 2 (505)), then to the virtual network stack (e.g., virtual network stack 1 (552), virtual network stack 3 (556)) connected to the NIC. Then, based on the packet's destination address, the packet is sent to the container (e.g., enterprise application (558), email server (522)) associated with the virtual network stack (e.g., virtual network stack 1 (552), virtual network stack 3 (556)), or sent to the virtual switch (535) to be routed to another container. For example, if a user on the internal network (525) was trying to access his/her email account, one or more packets from his/her computer would be sent to NIC 1 (500), then virtual network stack 1 (525), to virtual NIC 1 (506), and then to the virtual switch (535). The virtual switch (535) would then use the packets' destination address to find a match in the virtual switch's address table. Because the packet(s) are destined for the email server (522), the packet or packets would include a destination MAC address corresponding to virtual NIC 3 (550) and, as a result, be sent to virtual NIC 3 (550) from the virtual switch (535).

Virtual NIC 3 (550) would then send the packet(s) to virtual network stack 3 (556), then onto the email server (522). The email server may then process the packet(s) and send a reply to the user. In one or more embodiments of the invention, the packet(s) are processed by virtual network stack 3 (556) or virtual NIC 3 (550) before being sent to the email server (522). Processing may include authentication, encryption or decryption, network address translation (NAT), etc. In addition, one or more packets sent from the email server (522) to the internal network (525) as a reply may also be processed before being sent to the internal network (525).

In one or more embodiments of the invention, packets from the internal network (525) are automatically given access to certain features of the enterprise application (558) and/or email server (522), whereas packets from the external network (530) are not. Because the internal network (525) is already restricted to access by trusted users, such as developers, administrators, managers, and other members of an organization or company, packets from the internal network (525) may be able to access functions such as an internal website, message board, etc. In addition, users on the internal network (525) may be able to access some parts of the enterprise application (558) without a login and password, whereas users on the external network (530) must supply a valid login and password to access the enterprise application (558) and/or email server (522) at all. In one or more embodiments of the invention, the database (520) is not directly accessible by other hosts on the internal network (525) or external network (530), and can only communicate with the enterprise application (558) and/or email server (522).

For example, a user on the external network (530) may log onto the enterprise application (558) by supplying a valid login and password in the form of one or more packets to the host (502). The packet(s) are received at NIC 2 (505) and sent to virtual network stack 3 (556), NIC 3 (550), and onto the virtual switch (535), where the packets are routed to virtual NIC 1 (508) based on the packet's destination MAC address. Virtual NIC 1 (508) then sends the packet or packets to virtual network stack 1 (552), which sends the packet(s) to the enterprise application (558). To verify that the login and password are valid, the enterprise application (558) sends a query in the form of one or more packets to the database (520) through the virtual switch (535) containing the login and password. The query may also request that the database (520) provide any additional information, such as information needed to load the user's home page on the enterprise application (558), once the user has logged in.

The database (520) responds to the query with a match in one or more tables and any additional data, or no match to the supplied login and password. The enterprise application (558) then allows the user to access parts of the enterprise application (558) associated with the user account's access level if the login and password are valid, or the enterprise application (558) prompts the user to re-enter the login and password if the login and password are invalid. In one or more embodiments of the invention, the user is restricted to a certain number of attempts to log into the enterprise application (558). After the user has exceeded that number, he/she is prevented from attempting to log in using the same computer based on source IP address and/or MAC address, or other characteristics of the packets sent from that user.

Once the user is logged in, he/she can perform actions related to his/her user account on the enterprise application (558). For example, if the enterprise application allows a user to perform online banking, the user may choose to transfer balances between multiple accounts, open a new account, change his/her personal information, change his/her password, pay a credit card bill, etc. To do so, the user may access multiple pages on the enterprise application (558). In one or more embodiments of the invention, access to a new page on the enterprise application (558) is associated with a query to the database (520) for data related to that page.

For example, if the user goes to a page displaying the user's account balances, the enterprise application (558) would send a query to the database (520) requesting account balances based on the user's login and password, or another identifier for the user, such as a database primary key or a persistence object corresponding to the user. The database (520) then returns the results of its search. If account balances associated with the user are found in the database (520), the enterprise application (558) displays the balances on the page. Otherwise, the enterprise application (558) may state that no account balances have been found and prompt the user to create one or more accounts. Each "transaction" (e.g., loading of a page, submitting data through forms, sending/receiving email, etc.) between the user and the enterprise application (558) involves passing packets back and forth between the external network (530) and various virtual devices (e.g., virtual network stacks, virtual NICs, virtual switch, etc.) within the host (502). In addition, packets may be sent from the host (502) to the internal network (525) if additional information is needed from the internal network (525). For example, the internal network (525) may include a network attached storage device (not shown) including information about certain users; packets are sent from the enterprise application (558) and/or email server (522) to the network attached storage when information about one of those users is needed, whether by the user himself or by the enterprise application (558).

Figure 6:
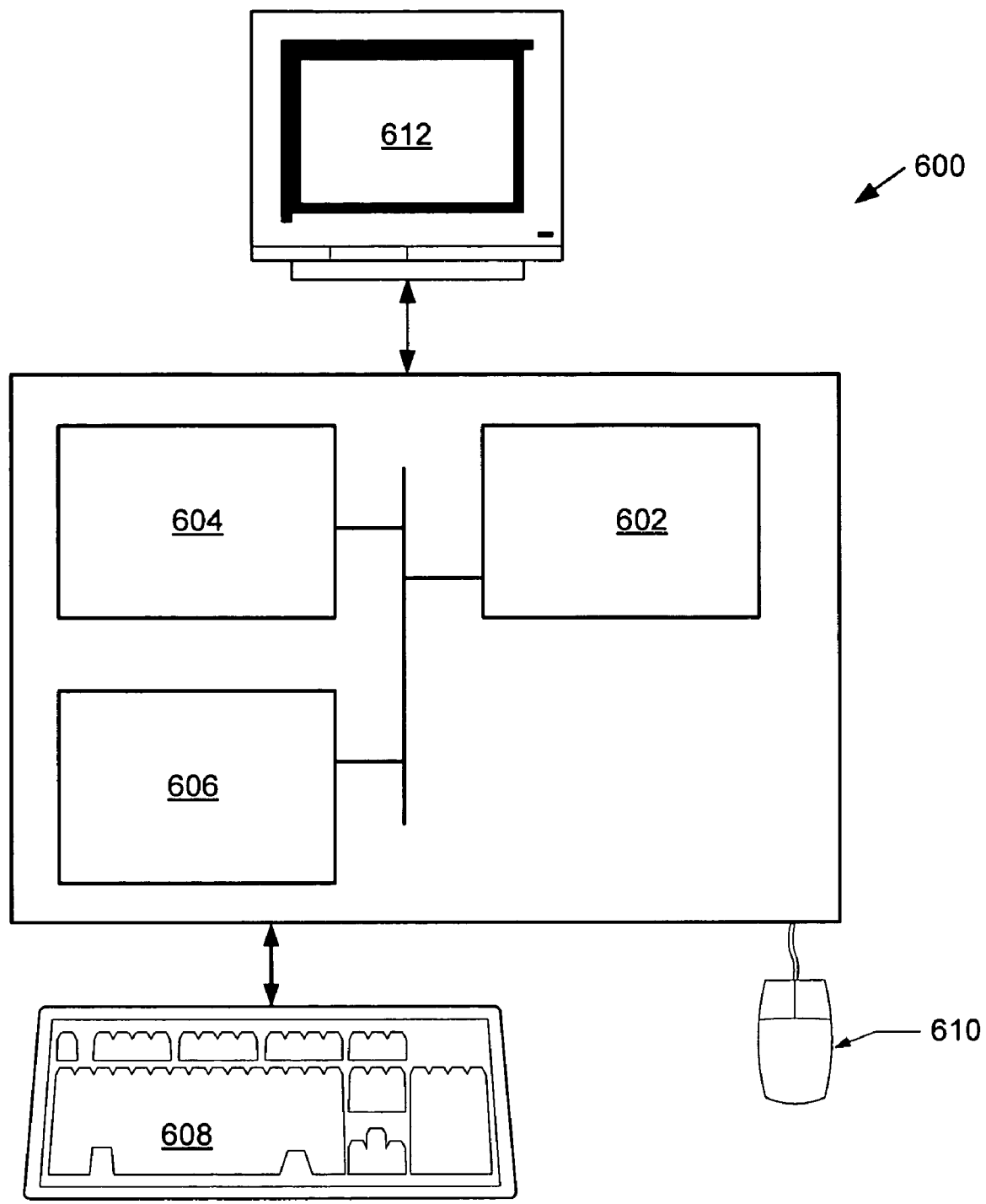
FIG. 6 shows a computer system in accordance with one or more embodiments of the invention.

The invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (600) may be located at a remote location and connected to the other elements over a network. Fun her, the invention may be implemented on a distributed system having a plurality of nodes, where each portion of the invention (e.g., virtual NIC, virtual network stack, virtual switch, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other physical computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for testing a network topology, comprising:
obtaining the network topology, wherein the network topology comprises a plurality of nodes connected by at least one link;
instantiating a plurality of containers, wherein each of the plurality of containers corresponds to one of the plurality of nodes, and wherein each of the plurality of containers shares a common kernel and executes within a common operating system;
instantiating a plurality of virtual network stacks, wherein each of the plurality of virtual network stacks is associated with one of the plurality of containers, wherein each of the plurality of virtual network stacks is associated with a virtual network interface card (NIC), and wherein each of the plurality of virtual NICs shares the common kernel and executes within the common operating system;
instantiating at least one virtual switch corresponding to the at least one link;
connecting at least one of the plurality of virtual NICs associated with at least one of the plurality of virtual network stacks using the at least one virtual switch;
configuring at least one of the plurality of virtual network stacks to send and receive packets; and
testing the network topology by sending a packet through at least one of the plurality of virtual network stacks and the at least one virtual switch, wherein a result of the testing is used to validate the network topology.

2. The method of claim 1, further comprising:
connecting one of the plurality of virtual network stacks to a physical NIC, wherein the physical NIC is connected to a subnetwork.

3. The method of claim 2, wherein the subnetwork comprises an external network.

4. The method of claim 2, wherein the subnetwork comprises an internal network.

5. The method of claim 1, wherein each of the plurality of virtual network stacks comprises a transport protocol.

6. The method of claim 1, wherein at least one of the plurality of virtual network stacks comprises a security policy.

7. The method of claim 1, wherein the network topology is implemented on a single host.

8. A system, comprising:
a host, comprising:
a plurality of containers, wherein each of the plurality of containers shares a common kernel and executes within a common operating system;

a plurality of virtual network stacks, wherein each of the plurality of virtual network stacks corresponds to one of the plurality of containers;

a plurality of virtual network interface cards (NICs), wherein each of the plurality of virtual network interface cards corresponds to one of the plurality of virtual network stacks, and wherein each of the plurality of virtual NICs shares the common kernel and executes within the common operating system; and at least one virtual switch connecting at least one of the plurality of virtual NICs, wherein each of the plurality of containers corresponds to one of a plurality of nodes in the virtual network, and wherein the at least one virtual switch corresponds to at least one link in the virtual network.

9. The system of claim 8, further comprising:
a physical NIC connected to a subnetwork,
wherein the physical NIC is connected to one of the plurality of virtual network stacks.

10. The system of claim 9, wherein the subnetwork comprises an external network.

11. The system of claim 9, wherein the subnetwork comprises an internal network.

12. The system of claim 9, wherein each of the plurality of virtual network stacks comprises a transport protocol.

13. The system of claim 9, wherein at least one of the plurality of virtual network stacks comprises a security policy.

14. A computer usable medium having computer readable program code embodied therein for causing a computer system to execute a method for testing a network topology, the method comprising:

obtaining the network topology, wherein the network topology comprises a plurality of nodes connected by at least one link;

instantiating a plurality of containers, wherein each of the plurality of containers corresponds to one of the plurality of nodes, and wherein each of the plurality of containers shares a common kernel and executes within a common operating system;

instantiating a plurality of virtual network stacks, wherein each of the plurality of virtual network stacks is associated with one of the plurality of containers, wherein each of the plurality of virtual network stacks is associated with a virtual network interface card (NIC), and wherein each of the plurality of virtual NICs shares the common kernel and executes within the common operating system;

instantiating at least one virtual switch corresponding to the at least one link;

connecting at least one of the plurality of virtual NICs associated with at least one of the plurality of virtual network stacks using the at least one virtual switch;

configuring at least one of the plurality of virtual network stacks to send and receive packets; and testing the network topology by sending a packet through at least one of the plurality of virtual network stacks and the at least one virtual switch, wherein a result of the testing is used to validate the network topology.

15. The computer usable medium of claim 14, the method further comprising:

connecting one of the plurality of virtual network stacks to a physical NIC, wherein the physical NIC is connected to a subnetwork.

16. The computer usable medium of claim 15, wherein the subnetwork comprises an external network.

17. The computer usable medium of claim 15, wherein the subnetwork comprises an internal network.

18. The computer usable medium of claim 14, wherein each of the plurality of virtual network stacks comprises a transport protocol.

19. The computer usable medium of claim 14, wherein at least one of the plurality of virtual network stacks comprises a security policy.

20. The computer usable medium of claim 14, wherein the network topology is implemented on a single host.

* * * * *

UNITED STATES PATENT AND TRADEMARK OFFICE
CERTIFICATE OF CORRECTION

| | | |
|---|---|---|
| PATENT NO. | : 7,733,795 B2 | |
| APPLICATION NO. | : 11/605114 | |
| DATED | : June 8, 2010 | |
| INVENTOR(S) | : Darrin P. Johnson et al. | |

It is certified that error appears in the above-identified patent and that said Letters Patent is hereby corrected as shown below:

On page 2, in column 2, under "Other Publications", line 2, delete "Architectual" and insert -- Architectural --, therefor.

On page 2, in column 2, under "Other Publications", line 9, delete "pges." and insert -- pages. --, therefor.

On page 2, in column 2, under "Other Publications", line 12, delete "Virlualization" and insert -- Virtualization --, therefor.

In column 15, line 64, delete "Fun her," and insert -- Further --, therefor.

Signed and Sealed this
Second Day of August, 2011

David J. Kappos
*Director of the United States Patent and Trademark Office*